United States Patent [19]
Yang

[11] Patent Number: 6,091,455
[45] Date of Patent: *Jul. 18, 2000

[54] STATISTICAL MULTIPLEXER FOR RECORDING VIDEO

[75] Inventor: Chao-Kung Yang, Huntington Beach, Calif.

[73] Assignee: Hughes Electronics Corporation, El Segundo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/792,631

[22] Filed: Jan. 31, 1997

[51] Int. Cl.$^7$ .............................. H04N 7/24; H04N 7/26
[52] U.S. Cl. ..................... 348/387; 348/390; 370/468; 370/477
[58] Field of Search .................................. 348/387, 390, 348/7; 370/468, 477; H04N 7/24, 7/26

[56] References Cited

U.S. PATENT DOCUMENTS

| | | | |
|---|---|---|---|
| 4,587,514 | 5/1986 | Schas et al. | 340/347 DD |
| 4,626,829 | 12/1986 | Hauck | 340/347 DD |
| 4,888,779 | 12/1989 | Karabed et al. | 371/43.4 |
| 4,918,523 | 4/1990 | Simon et al. | 358/133 |
| 4,975,771 | 12/1990 | Kassatly | 358/146 |
| 5,038,389 | 8/1991 | Mizuno | 382/248 |
| 5,097,261 | 3/1992 | Langdon, Jr. et al. | 341/51 |
| 5,115,309 | 5/1992 | Hang | 358/133 |
| 5,122,873 | 6/1992 | Golin | 348/390 |

(List continued on next page.)

FOREIGN PATENT DOCUMENTS

| | | |
|---|---|---|
| 574 724 A2 | 12/1993 | European Pat. Off. . |
| 615 384 A2 | 9/1994 | European Pat. Off. . |
| 621 730 A2 | 10/1994 | European Pat. Off. . |
| 712 251 A2 | 5/1996 | European Pat. Off. . |
| 273653 | 1/1996 | Japan . |

OTHER PUBLICATIONS

Abbas et al., "Performance analysis of an ATM statistical multiplexer with batch arrivals", IEEE Proc.–Commun., vol. 141, No. 3, Jun. 1994, pp.190–195.

Anderson et al., "Support For Continuous Media in the Dash System[1]", 1990 IEEE, pp. 54–61.

Beakley, "Channel Coding for Digital HDTV Terrestrial Broadcasting", Transactions on Broadcasting,vol. 37, No. 4, Dec. 1991, pp. 137–140.

Dixit et al., "Video Traffic Smoothing and ATM Multiplexer Performance", 1991 IEEE, pp. 8B.3.1–8B.3.5.

Eleftheriadis et al., "Optimal Data Partitioning of MPEG–2 Coded Video", 1994 IEEE, pp. 273–277.

Eng et al., "Time–Compression Multiplexing (TCM) of Three Braodcast–Quality TV Signals on a Salelite Transponder", The Bell System Technical Journal, vol. 62, No. 10, Part 1, Dec. 1983, pp. 2853–2863.

(List continued on next page.)

*Primary Examiner*—Howard Britton
*Attorney, Agent, or Firm*—John A. Crook; Michael W. Sales

[57] ABSTRACT

A statistical multiplexing apparatus for permanently recording a plurality of video signals on a video generator so that video programs represented by the video signals can be repeatedly broadcast is provided with a video analyzer for analyzing a first video signal and a second video signal and generating a first compression signal and a second compression signal, a first video encoder for encoding the first video signal at a variable rate determined by the first compression signal to form a first encoded video signal, a second video encoder for encoding the second video signal at a variable rate determined by the second compression signal to form a second encoded video signal, and a video generator for permanently recording the first and second encoded video signals so that the first and second encoded video signals can be repeatedly broadcast from the video generator.

18 Claims, 5 Drawing Sheets

U.S. PATENT DOCUMENTS

| | | | |
|---|---|---|---|
| 5,128,754 | 7/1992 | Dhein | 358/105 |
| 5,136,375 | 8/1992 | Citta et al. | 358/133 |
| 5,216,503 | 6/1993 | Paik | 348/390 |
| 5,231,494 | 7/1993 | Wachob | 358/146 |
| 5,291,281 | 3/1994 | Paik et al. | 348/384 |
| 5,319,457 | 6/1994 | Nakahashi et al. | 348/387 |
| 5,319,707 | 6/1994 | Wasilewski et al. | 380/14 |
| 5,367,334 | 11/1994 | Nishino | 348/390 |
| 5,376,968 | 12/1994 | Wu et al. | 348/413 |
| 5,392,223 | 2/1995 | Caci | 364/514 |
| 5,400,401 | 3/1995 | Wasilewski et al. | 380/9 |
| 5,440,334 | 8/1995 | Walters | 348/7 |
| 5,442,626 | 8/1995 | Wei | 370/20 |
| 5,446,916 | 8/1995 | Derovanessian et al. | 395/800 |
| 5,448,568 | 9/1995 | Delpuch et al. | 372/94.2 |
| 5,475,716 | 12/1995 | Huang | 375/354 |
| 5,479,210 | 12/1995 | Cawley et al. | 348/390 |
| 5,495,291 | 2/1996 | Adams | 348/390 |
| 5,499,245 | 3/1996 | Lee et al. | 370/94.2 |
| 5,506,844 | 4/1996 | Rao | 370/84 |
| 5,509,017 | 4/1996 | Brandenburg et al. | 370/112 |
| 5,515,377 | 5/1996 | Horne et al. | 370/94.1 |
| 5,521,945 | 5/1996 | Knudson | 375/341 |
| 5,532,744 | 7/1996 | Akiwumi-Assani et al. | 348/390 |
| 5,533,009 | 7/1996 | Chen | 370/17 |
| 5,541,852 | 7/1996 | Eyuboglu et al. | 364/514 C |
| 5,548,532 | 8/1996 | Menand et al. | 364/514 C |
| 5,550,590 | 8/1996 | Sakazawa et al. | 348/387 |
| 5,563,961 | 10/1996 | Rynderman et al. | 382/239 |
| 5,629,736 | 5/1997 | Haskell | 348/387 |
| 5,633,683 | 5/1997 | Rosengren et al. | 348/385 |
| 5,646,942 | 7/1997 | Oliver et al. | 348/385 |
| 5,687,163 | 11/1997 | Fox et al. | 370/207 |
| 5,790,177 | 8/1998 | Kassatly | 348/385 |
| 5,812,334 | 9/1998 | Behrens et al. | 360/40 |

OTHER PUBLICATIONS

Garcia et al., "Statistcal Multiplexing Gain Using Space Priority Mechanisms", 1991 IEEE, pp. 27.3.1–27.3.5.

Gemmell et al., "Multimedia Storage Servers: A Tutorial", IEEE, May 1995, pp. 40–49.

Guha et al., "Multichannel Joint Rate Control of VBR MPEG Encoded Video for DBS Applications", IEEE Transactions on Consumer Electronics, vol. 40, No. 3, Aug. 1994, pp. 616–623.

Haskell et al., "Multiplexing of Variable rate Encoded Streams", IEEE Transactions on Circuits and Systems for Video Technology, vol. 4, No. 4, Aug. 1994, pp. 417–424.

Haskell et al., "Variable BIT–Rate Video Coding for ATM and Broadcast Applications", 1993 IEEE, pp.119–126.

Hulyalkar et al., "Advanced Digital HDTV Tranmission System for Terrestrial Video Simulcasting", IEEE Journal On Selected Areas In Communications, vol. 11, No.1, Jan. 1993, pp.119–126.

Inoue et al., "Encoding and Decoding in the 60MHz NTSC––Compatible Widescreen Television System", IEEE Transactions on Circuits and Systems for Video Technology, vol.1 No. 1, Mar. 1991, pp. 49–58.

Kao et al., "Time–Multiplexing Analog Transmission of Three Broadcast–Quality Television Channels Through One Satelite Transponder", IEEE Journal On Selected Areas In Communications, vol. SAC–5, No. May 1987, pp. 676–684.

Kessman et al., "Anaylsis of Joint Bit–Rate Control in Multi–Program Image Coding", SPIE vol. 2308, 1994, pp. 1906–1917.

Krunz et al., "Statistical Characteristics and Multiplexing of MPEG Streams", 1995 IEEE, pp. 455–462.

Kuo, Geng–Sheng, "A New Generalized Framework for VOD Transmission on Future High–Speed BISDN", IEEE Transactions on Consumer Electronics, vol. 42, No. 1, Feb. 1996, pp.268–272.

Liew et al., "Video Aggregation: Adapting Video Traffic for Transport Over Broadband Network by Intergrating Data Compression and Statistical Multiplexing", IEEE Journal On Selected Areas In Communications vol. 14, No. 6, Aug. 1996, pp. 1123–1137.

Pancha et al., "Bandwidth–Allocation Schemes for Variable–Bit–Rate MPEG Sources in ATM Networks", IEEE Transactions on Circuits and Systems for Video Technology, vol. 3, No.3, Jun. 1993, pp. 190–198.

Panchanathan et al., "Robust Algorithms for Image Transmission over ATM Networks", SPIE vol. 2308, 1994, pp. 1918–1923.

Reininger et al., "Statistical Multiplexing of VBR MPEG Compressed Video on ATM Networks", 1993 IEEE, pp. 919–926.

Robinson et al., "The Influence of Scene Content on Bit–Rate Variations in ATM Video", 5 pages, undated.

Saleh et al., "Simulation Analysis of a Communication Link with Statistically Multiplesed Bursty Voice Sources", IEEE Journal On Selected Areas In Communications, vol. 11, No. 3, Apr. 1993, pp. 432–442.

Tse et al., "Video Aggregation: An Integrated Video Compression and Multiplexing Scheme for Broadband Networks", 1995 IEEE, pp. 439–446.

Tse et al., "Statistical Multiplexing of Multiple Time–Scale Markov Streams", IEEE Journal On Selected Areas In Communications, vol. 13, No. 6, Aug. 1995, pp. 1028–1038.

Vin et al., "Designing a Multiuser HDTV Storage Server", IEEE Journal On Selected Areas In Communications, vol. 11, No. 1, Jan. 1993, pp. 153–164.

Wu et al., "Computational Methods for Performance Evaluation of a Statistical Multiplexer Supporting Bursty Traffic", IEEE Transactions On Networking, vol. 4, No. 3, Jun. 1996, pp. 386–397.

Technology Demonstration by DMV, Imedia and Silicon Graphics, NAB '96, Apr. 15–18, 2 pages.

Imedia Corporation, Company Backgrounder, Apr. 1996, 6 pages.

Imedia Corporation, "Imedia StatMux™ Increased Channel Utilization: Many More Channels" (undated), 5 pages.

Imedia Corporation, "Imedia StatMux#—24 Digital Channels in the Space of 1 Analog Channel"(undated), p.9

STATISTICAL MULTIPLEXER FOR RECORDING VIDEO

BACKGROUND OF THE INVENTION

The present invention relates to a statistical multiplexer for recording video signals for repeat broadcasting.

Conventional video broadcast systems for transmitting video signals or channels from a central location to a plurality of remote viewing locations may be of several different types, including cable television systems and satellite-based broadcast systems. Since the overall bandwidth of a video broadcast system is limited, there is a limit to the number of video channels that can be included in a broadcast transmission.

U.S. Pat. No. 5,216,503 to Paik, et al. discloses a statistical multiplexing apparatus which is used to selectively compress a plurality of video signals prior to being broadcast. In the Paik, et al. system, each video signal is provided to an encoder prior to being broadcast. Each encoder is connected to a respective buffer, which is in turn connected to a multiplexer. Each encoder is connected to a controller, which generates coding level commands to control the degree to which the encoders compress the video signals.

SUMMARY OF THE INVENTION

The invention is directed to a statistical multiplexing apparatus for permanently recording a plurality of video signals on a video generator, such as a video server, so that video programs represented by the video signals can be repeatedly broadcast. The apparatus includes a video analyzer for analyzing first and second video signals and generating first and second compression signals, a first video encoder for encoding the first video signal at a variable rate determined by the first compression signal to form a first encoded video signal, a second video encoder for encoding the second video signal at a variable rate determined by the second compression signal to form a second encoded video signal, and a video generator for permanently recording the first and second encoded video signals so that the first and second encoded video signals can be repeatedly broadcast from the video generator.

The first and second encoded video signals may correspond to movies, and the video generator may comprise means for broadcasting the first and second encoded video signals a plurality of times in a day or month at predetermined times. The video analyzer may have first and second complexity detectors for generating first and second complexity signals that are representative of the complexity of the first and second video signals, respectively, first and second frame processors for generating first and second frame signals representing the types of video frames of the first and second video signals, respectively, and means for generating the first and second compression signals based upon the first and second complexity signals and the first and second frame signals.

The invention is also directed to a method of permanently recording a plurality of video signals for repeat broadcasting. The method includes the steps of analyzing a first video signal and a second video signal and generating a first compression signal and a second compression signal, encoding the first and second video signals at variable rates determined by the first and second compression signals to form first and second encoded video signals, permanently recording the first and second encoded video signals on a video generator, and broadcasting the first and second encoded video signals repeatedly from the video generator.

The recorded video signals may be broadcast a plurality of times in a day or month at predetermined times, and the analyzing step may include the steps of generating a first complexity signal representative of the complexity of the first video signal, generating a second complexity signal representative of the complexity of the second video signal, and generating the first and second compression signals based on the first and second complexity signals.

These and other features and advantages of the present invention will be apparent to those of ordinary skill in the art in view of the detailed description of the preferred embodiment, which is made with reference to the drawings, a brief description of which is provided below.

DETAILED DESCRIPTION OF THE PREFERRED EMBODIMENTS

Figures 1, 2:
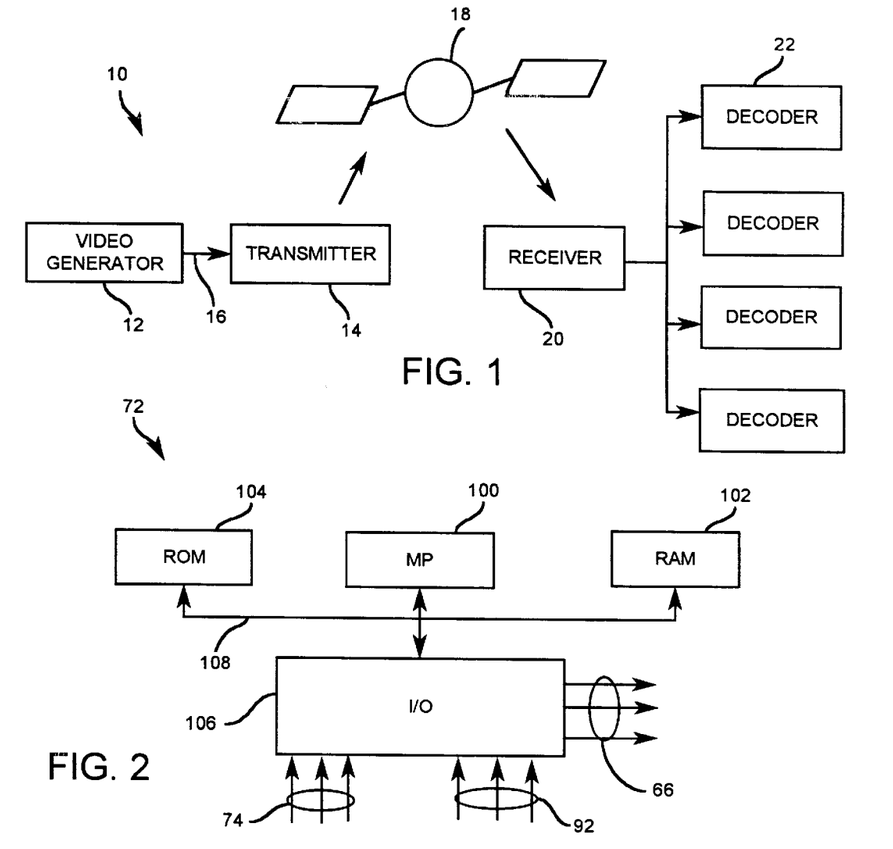
FIG. 1 is a block diagram of a video broadcast system.
FIG. 2 is a block diagram of a controller used in a preferred embodiment of a statistical multiplexer for recording video data on the video generator of FIG. 1.

A video broadcast system 10 in accordance with the invention is illustrated in FIG. 1. Referring to FIG. 1, the system 10 includes a video generator 12 connected to transmit a video data stream to a conventional transmitter 14 via a data link 16. The video generator 12, which may be a digital video disk (DVD) or a video server, permanently stores compressed video data representing a plurality of pre-recorded video programs or movies. The transmitter 14 transmits the video data stream to a satellite 18, and video data is broadcast by the satellite 18 to a plurality of conventional receivers 20, one of which is shown in FIG. 1. Each receiver 20 may correspond to a house or a multiple dwelling unit, such as an apartment building. Where the receiver 20 is used for a multiple dwelling unit, the receiver 20 is connected to a plurality of decoders 22, each of which corresponds to a separate dwelling unit within the multiple dwelling unit.

Figure 4:
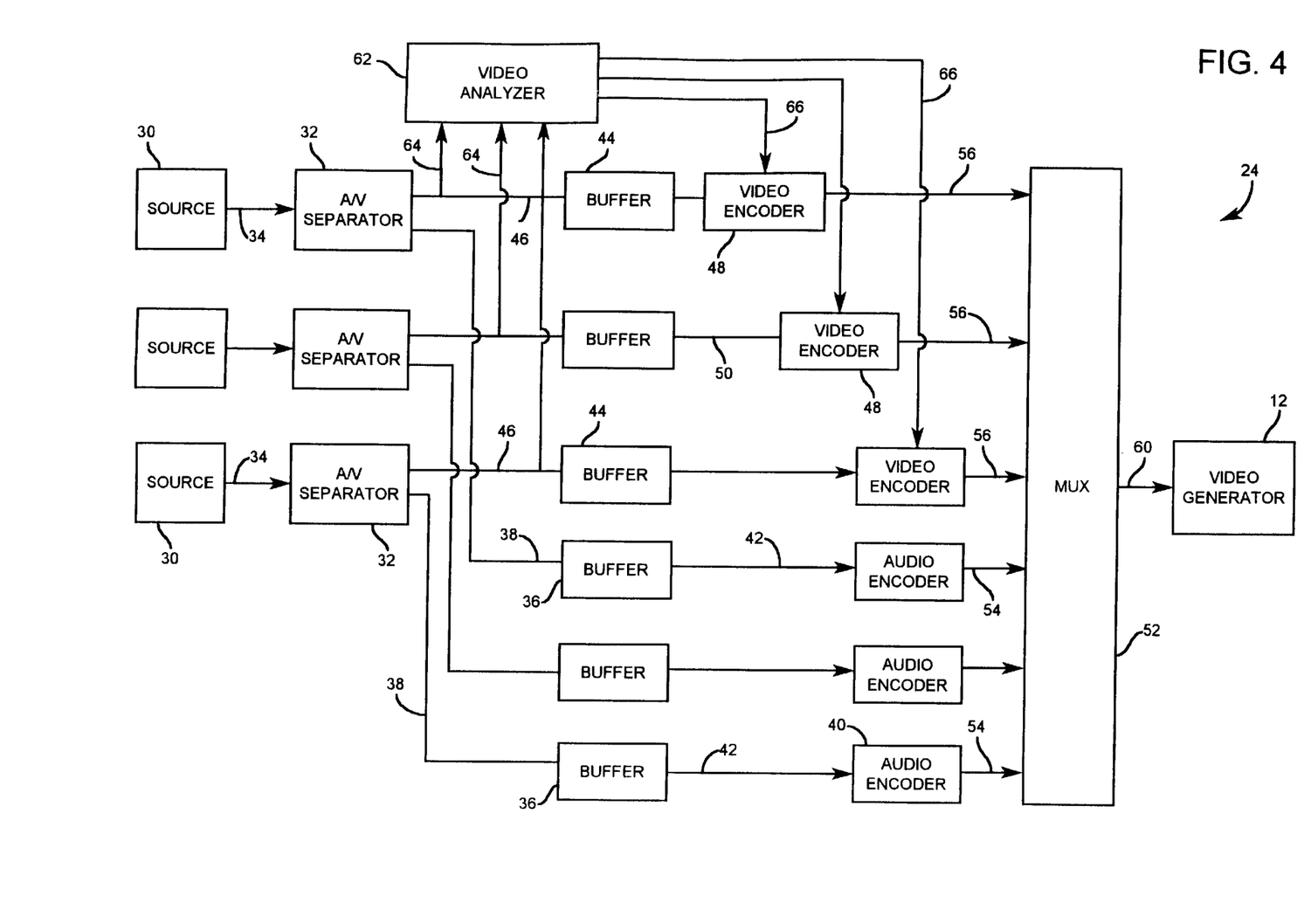
FIG. 4 is a block diagram of a preferred embodiment of a statistical multiplexer in accordance with the invention shown connected to a plurality of program sources and the video generator of FIG. 1.

FIG. 4 is a block diagram of a preferred embodiment of a statistical multiplexer 24 that is used to variably encode video signals corresponding to a plurality of video programs and permanently record the encoded video signals onto the video generator 12 so that the video generator 12 may be subsequently used at various times to generate the video data stream for broadcast by the system 10.

Referring to FIG. 4, the statistical multiplexer 24 is connected to three audiovisual program sources 30 each of which generates a respective audiovisual signal which is provided to a conventional audiovisual (A/V) separator 32 of the statistical multiplexer 24 via a line 34. The audiovisual program sources 30 may comprise, for example, video cassette recorders. The audiovisual program of each source 30 may be a movie or a pre-recorded program. Although only three sources 30 are shown, it should be understood that any number of sources 30 could be used.

Each A/V separator 32 separates the audio portion of its audiovisual signal from the video portion. The audio portion of each signal is transmitted from its A/V separator 32 to a buffer 36 via a line 38 and then to a conventional audio encoder 40 via a line 42. The video portion of each signal is transmitted from its A/V separator 32 to a buffer 44 via a line 46 and then to a video encoder 48 via a line 50. After being encoded in a conventional manner, the audio signal from each audio encoder 40 is transmitted to a conventional multiplexer 52 via a respective line 54. After being encoded by the encoders 48, the video signals are transmitted to the multiplexer 52 via lines 56. The multiplexer 52 multiplexes the audio and video signals in a conventional manner, and then transmits the multiplexed signals to the video generator 12 via a line 60, where the signals are permanently recorded for repeat broadcasting.

The video signal from each A/V separator 32 is transmitted to a video analyzer 62 via a respective line 64. The analyzer 62 analyzes the video signals, as described below, to periodically generate three compression signals which are transmitted to the three video encoders 48 for the video signals, via respective lines 66, to control the degree to which each video signal is compressed by its video encoder 48. The amount of delay caused by the buffers 36, 44 corresponds to the amount of time which elapses between the transmission of the video signals to the video analyzer 62 and the transmission of the compression signals to the video encoders 48 via the lines 66.

Figure 6:
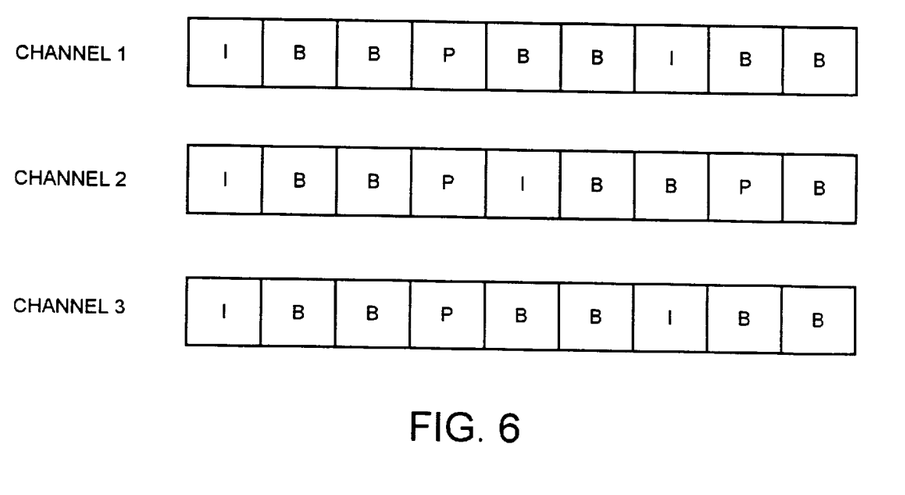
FIG. 6 is an example of the video frame organization for three video channels.

FIG. 6 schematically illustrates the video frame organization of three exemplary video signals of three different video channels. Referring to FIG. 6, each video signal comprises a plurality of video frames, each of which is identified as an I-frame, a B-frame, or a P-frame. Those three types of video frames are well known and are used in conventional MPEG (Moving Pictures Experts Group) encoding protocols. In accordance with such encoding, in the absence of scene changes in the video signals, every Nth video frame is automatically designated an I-frame. Between I-frames, one or more equally spaced frames are designated P-frames, and all other frames are designated B-frames. During subsequent processing of the video signals, the image data that makes up a P-frame is predicted on the basis of previous adjacent I-frames or P-frames, and the image data making up the B-frames is bi-directionally interpolated based on adjacent I- and P-frames or between two P-frames.

I-frames are typically encoded with three times the data with which P-frames are encoded, and P-frames are typically encoded with three times the data with which B-frames are encoded. If a scene change is detected, the video frame corresponding to the scene change is automatically designated an I-frame so that the frame will be represented by a relatively large amount of data. In FIG. 6, every 6th video frame of the video channels is automatically designated an I-frame, except for the second video channel, since the fifth frame of that channel corresponds to a scene change and is thus designated an I-frame.

Figure 5:
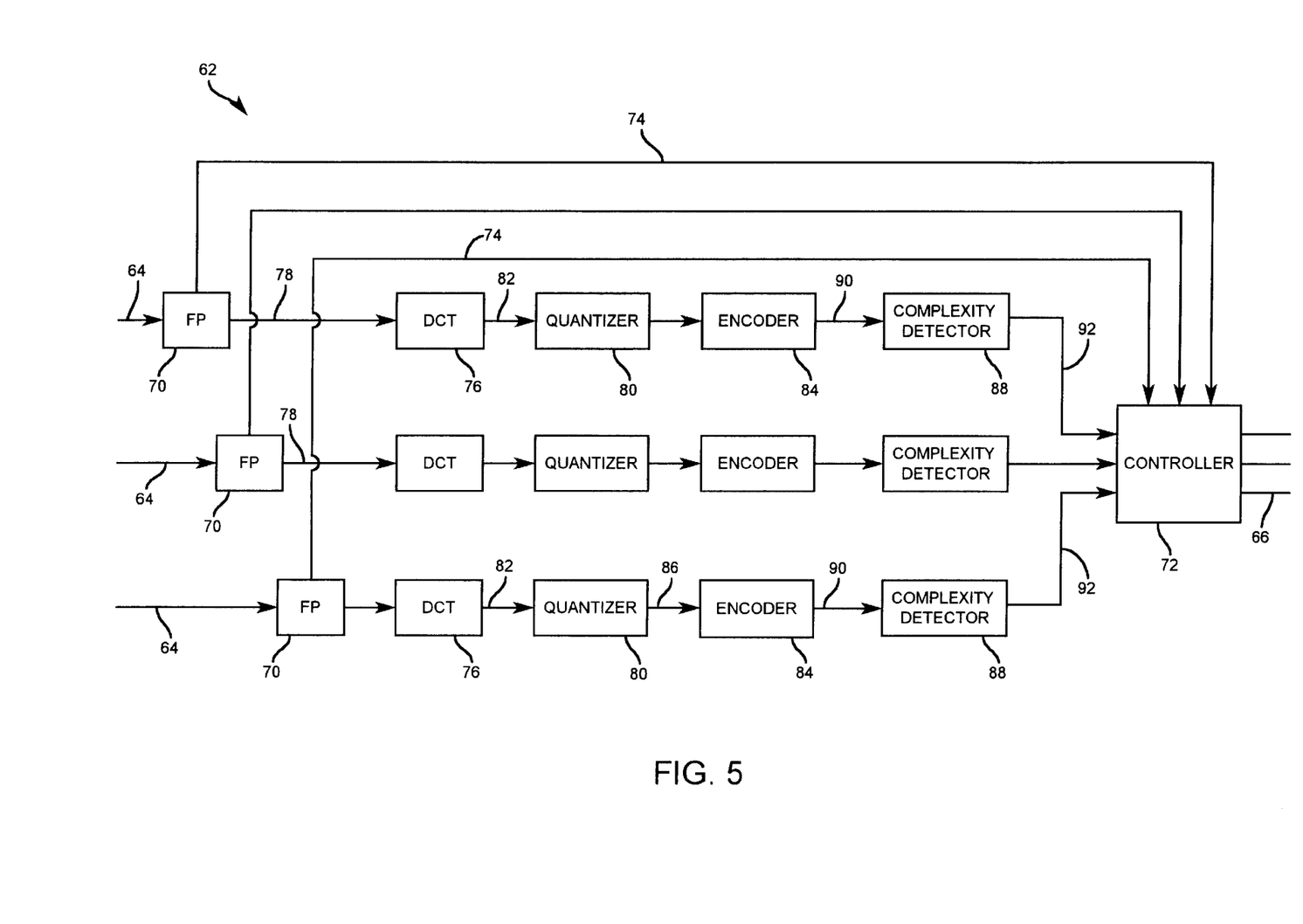
FIG. 5 is a block diagram of the video analyzer schematically shown in FIG. 4.

FIG. 5 is a block diagram of the video analyzer 62. Referring to FIG. 5, each of the video signals on the lines 64 is provided to a frame processor (FP) 70 which separates each incoming video signal into successive video frames as described above. Each frame processor 70 transmits the type of each successive video frame to a controller 72 via a respective line 74. Each video signal is then transmitted from its frame processor 70 to a conventional discrete-cosine transform (DCT) circuit 76 via a line 78. The DCT circuit 76 converts the video signal into a plurality of transform coefficients, each transform coefficient being represented by a plurality of data bits. Each video signal is then provided to a conventional quantizer 80 via a line 82. The quantizer 80 compresses the video signal by reducing a number of data bits from the transform coefficients based upon the magnitude of a fixed, constant quantizing factor, also referred to as a compression factor.

The video signal is then transmitted to an encoder 84 via a line 86, where it is encoded in a conventional manner. The video signal output by each encoder 84 is segmented into video frames, as described above, and the encoded data representing each video frame is segmented into "macroblocks," each of which corresponds to a square portion of the image of the video frame sixteen pixels on a side (i.e. 16 pixels by 16 pixels). Each encoded video signal is then transmitted to a complexity detector 88 via a line 90. Each complexity detector 88 analyzes the macroblocks that make up each video frame, generates a signal representing the complexity of each of the macroblocks, and transmits those complexity signals or factors to the controller 72 via a respective line 92.

Figure 7:
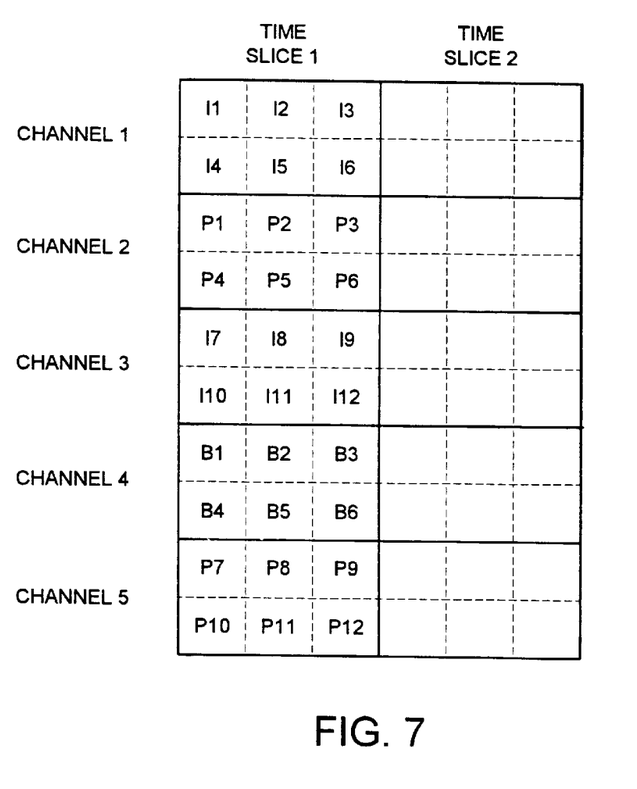
FIG. 7 is an example of the macroblock organization for two successive frames of five video channels.

FIG. 7 illustrates in a simplified manner the assignment of complexity factors for five video signals on five different channels. Referring to FIG. 7, two time slices of video signals are shown for the five channels, with each time slice being one video frame in width or duration. Each video frame is shown to be three macroblocks wide by two macroblocks deep, with the macroblocks being defined by dotted lines. It should be understood that an actual video frame would include many more macroblocks than are shown in FIG. 7. In the case of a video image 480 pixels deep by 640 pixels wide, each frame would be 30 macroblocks deep by 40 macroblocks wide.

Each macroblock in the first time slice in FIG. 7 has been assigned an alphanumeric complexity factor. Although there is only one type of complexity factor, the complexity factors have been assigned three different alphabetic designations to distinguish complexity factors assigned to I-frames from those assigned to other types of frames. Each complexity factor may be, for example, the number of data bits used to encode the image information for the corresponding macroblock.

Figure 3:
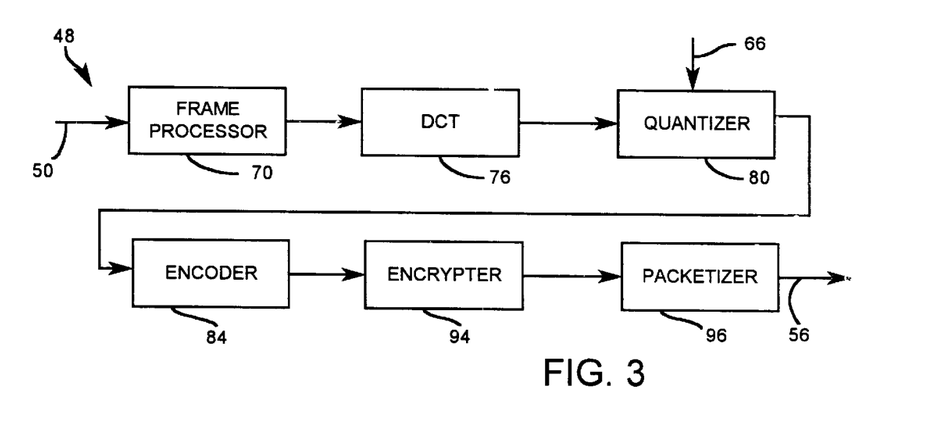
FIG. 3 is a block diagram of a video encoder used in the statistical multiplexer.

Each video encoder 48 shown schematically in FIG. 4 can be any type of conventional encoder. FIG. 3 illustrates one embodiment of an encoder 48 which may be used to compress a video signal in accordance with a standard MPEG compression protocol. Referring to FIG. 3, the video encoder 48 includes a frame processor 70, a DCT circuit 76, a quantizer 80, and an encoder 84 as described above in connection with FIG. 5. The video encoder 48 may include, if necessary or desired, an encrypter 94 for encrypting the video signal and a packetizer 96 which converts the video signal into data packets suitable for broadcast transmission. The particular design of the video encoders 48 is not considered important to the invention, and alternative designs could be used. For example, the encoder disclosed in U.S. Pat. No. 5,216,503 to Paik, et al., the disclosure of which is incorporated herein by reference, could be used.

Referring to FIG. 2, the controller 72 shown schematically in FIG. 5 may take the form of a conventional computer system having a microprocessor (MP) 100, a random-access memory (RAM) 102, a program memory such as a read-only memory (ROM) 104, and an input/output (I/O) circuit 106, all of which are interconnected via an address/data bus 108. The overall operation of the controller 72 is controlled by a computer program stored in the program memory 104 and executed by the microprocessor 100.

Figure 8:
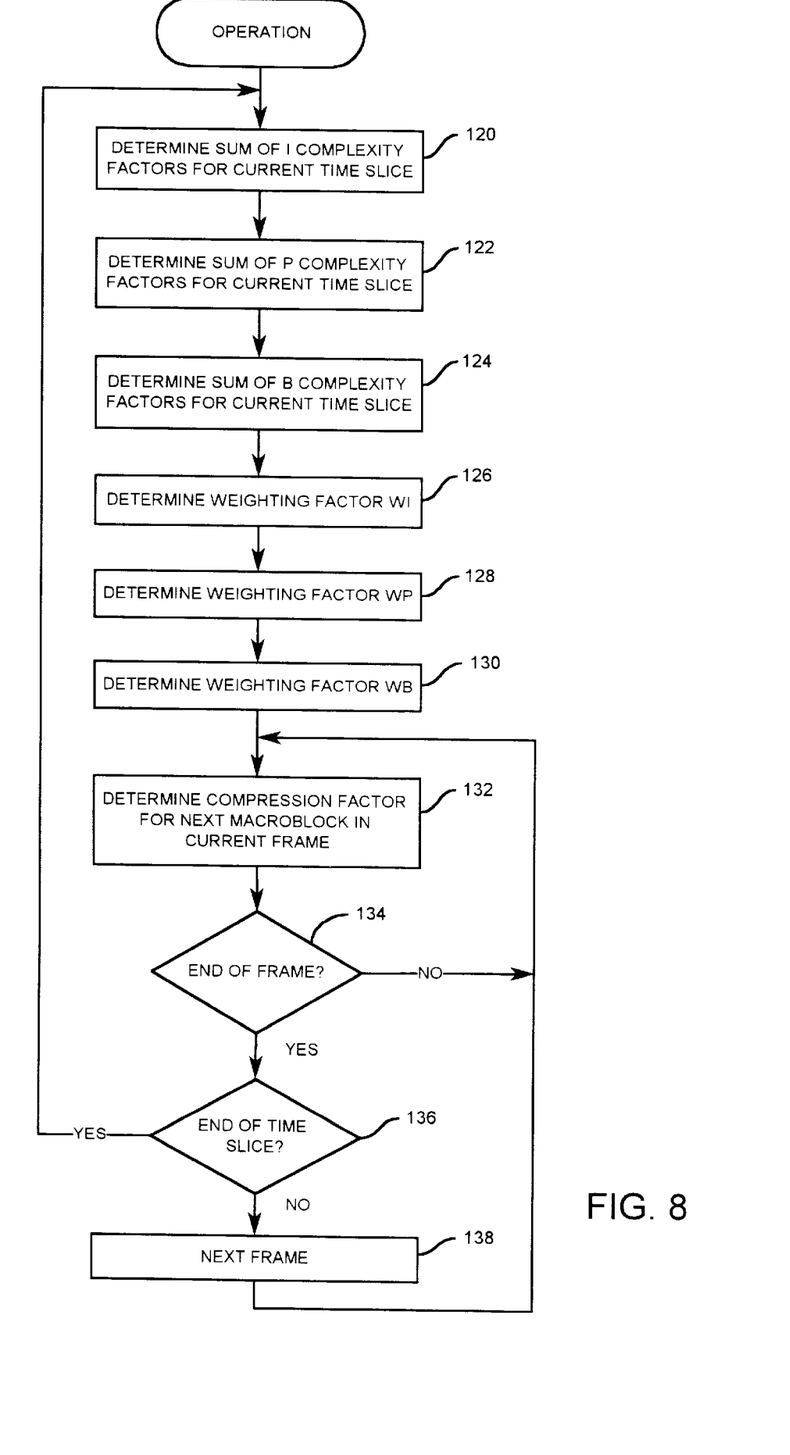
FIG. 8 is a flowchart which illustrates the operation of the statistical multiplexer.

FIG. 8 is flowchart of a computer program which controls the operation of the controller 72. During operation, the controller 72 examines one time slice (see FIG. 7) of the video signals at a time and then determines the compression factors which are used to control the degree of video data compression utilized by the video encoders 48. A compression factor for each macroblock of each video signal is determined, and the video encoders 48 compress the video signals on a macroblock-by-macroblock basis.

Referring to FIG. 8, at step 120, the complexity factors generated by the complexity detectors 88 for all I-frames in the current time slice are added together. Referring to FIG. 7, this would be the sum of the twelve complexity factors $I_1$ through $I_{12}$. At step 122, the complexity factors for all B-frames in the current time slice are added together. This would be the sum of the six complexity factors $B_1$ through $B_6$ shown in FIG. 7. At step 124, the complexity factors for all P-frames in the current time slice are added together. This would be the sum of the twelve complexity factors $P_1$ through $P_{12}$ shown in FIG. 7.

At step 126, a weighting factor $W_I$ used in the determination of the compression factors for the macroblocks of each I-frame is determined in accordance with the following equation:

$$W_I = R_I/(R_I \times C_{ISUM} + R_P \times C_{PSUM} + C_{BSUM}),$$

where $R_I$ is a controllable constant (typically equal to about nine) representing the ratio of the number of data bits used to encode I-frames to the number of data bits used to encode B-frames, where $R_P$ is also a controllable constant (typically equal to about three) representing the ratio of the number of data bits used to encode P-frames to the number of data bits used to encode B-frames, where $C_{ISUM}$ is the sum of the complexity factors for the I-frames as determined in step 120, where $C_{PSUM}$ is the sum of the complexity factors for the P-frames as determined in step 122, and where $C_{BSUM}$ is the sum of the complexity factors for the B-frames as determined in step 124.

At step 128, a weighting factor $W_P$ used in the determination of the compression factors for the macroblocks of each P-frame is determined in accordance with the following equation:

$$W_P = R_P/(R_I \times C_{ISUM} + R_P \times C_{PSUM} + C_{BSUM}),$$

and at step 130, a weighting factor $W_B$ used in the determination of the compression factors for the macroblocks of each B-frame is determined in accordance with the following equation:

$$W_B = 1/(R_I \times C_{ISUM} + R_P \times C_{PSUM} + C_{BSUM}).$$

After the weighting factors $W_I$, $W_P$, and $W_B$ are determined, the compression factor for each macroblock in the current time slice is determined. At step 132, the compression factor CF for the next (or first) macroblock in the current video frame is determined in accordance with the following equation:

$$CF = W \times C \times BW,$$

where W is the weighting factor, determined at one of steps 126–130, that corresponds to the current frame type, where C is the complexity factor for the current macroblock generated by one of the complexity detectors 88, and where BW is the bandwidth available for all of the video signals. For example, the compression factor CF for the first (upper left) macroblock in the first video channel shown in FIG. 7 would be equal to $W_I \times I_1 \times BW$.

Step 132 is repeated for each macroblock in the current video frame. When the end of the current video frame is reached as determined at step 134, the program branches to step 136, which determines if the end of the current time slice has been reached. If so, the program branches to steps 120–130 to determine the weighting factors for the next time slice. If not, the program branches to step 138 and then 132 where the compression factors for the macroblocks in the next video frame are determined.

The manner of determining the compression factors for the macroblocks in each video channel could also include video channel weighting factors that would selectively weight each video channel based upon its content. For example, a video channel having an action movie could be weighted heavier than another channel so that the action movie would be encoded with more video data.

Referring to FIG. 4, as the video signals are compressed in accordance with the compression signals generated above and transmitted to the video encoders 48 via the lines 66, they are transmitted to the multiplexer 52 and then subsequently recorded on the video generator 12. Once the video programs from the video sources 30 have been recorded onto the video generator 12, the video generator 12 may be used repeatedly (e.g. multiple times per day or month at predetermined times) to generate the recorded video signals for broadcasting in the video broadcast system 10 of FIG. 1.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An apparatus for recording a plurality of video signals, said apparatus comprising:
   a video analyzer for analyzing a first video signal and a second video signal and generating a first compression signal and a second compression signal;
   a first video encoder for encoding said first video signal at a variable rate determined by said first compression signal to form a first encoded video signal;
   a second video encoder for encoding said second video signal at a variable rate determined by said second compression signal to form a second encoded video signal; and
   a video generator for permanently recording said first and second encoded video signals so that said first and second encoded video signals can be repeatedly broadcast from said video generator,
   wherein each of said first and second encoded video signals corresponds to a movie and wherein said video generator comprises means for broadcasting said first and second encoded video signals a plurality of times in a day at predetermined times,
   wherein said first video signal has a complexity which varies over time, wherein said second video signal has a complexity which varies over time, and wherein said video analyzer comprises:
- a first complexity detector for generating a first complexity signal which is representative of said complexity of said first video signal;
- a second complexity detector for generating a second complexity signal which is representative of said complexity of said second video signal;
- means for determining a weighting factor based upon said first complexity signal and said second complexity signal; and
- means for generating said first compression signal based upon said weighting factor and said first complexity signal.

2. An apparatus for recording a plurality of video signals, said apparatus comprising:
- a video analyzer for analyzing a first video signal and a second video signal and generating a first compression signal and a second compression signal;
- a first video encoder for encoding said first video signal at a variable rate determined by said first compression signal to form a first encoded video signal;
- a second video encoder for encoding said second video signal at a variable rate determined by said second compression signal to form a second encoded video signal; and
- a video generator for permanently recording said first and second encoded video signals so that said first and second encoded video signals can be repeatedly broadcast from said video generator,
- wherein said first video signal has a complexity which varies over time, wherein said second video signal has a complexity which varies over time, and wherein said video analyzer comprises:
  - a first complexity detector for generating a first complexity signal which is representative of said complexity of said first video signal;
  - a second complexity detector for generating a second complexity signal which is representative of said complexity of said second video signal;
  - means for determining a weighting factor based upon said first complexity signal and said second complexity signal; and
  - means for generating said first compression signal based upon said weighting factor and said first complexity signal.

3. An apparatus for recording a plurality of video signals, said apparatus comprising:
- a video analyzer for analyzing a first video signal and a second video signal and generating a first compression signal and a second compression signal;
- a first video encoder for encoding said first video signal at a variable rate determined by said first compression signal to form a first encoded video signal;
- a second video encoder for encoding said second video signal at a variable rate determined by said second compression signal to form a second encoded video signal; and
- a video generator for permanently recording said first and second encoded video signals so that said first and second encoded video signals can be repeatedly broadcast from said video generator;
- wherein said first video signal has a complexity which varies over time and is segmented into a plurality of video frames each having a type, wherein said second video signal has a complexity which varies over time and is segmented into a plurality of video frames each having a type, and wherein said video analyzer comprises:
  - a first complexity detector for generating a first complexity signal which is representative of said complexity of said first video signal;
  - a second complexity detector for generating a second complexity signal which is representative of said complexity of said second video signal;
  - a first frame processor for generating a first frame signal representing said type of one of said video frames of said first video signal;
  - a second frame processor for generating a second frame signal representing said type of one of said video frames of said second video signal; and
  - means for generating said first and second compression signals based upon said first and second complexity signals and said first and second frame signals.

4. An apparatus for recording a plurality of video signals, said apparatus comprising:
- a video analyzer for analyzing a first video signal and a second video signal and generating a first compression signal and a second compression signal;
- a first video encoder for encoding said first video signal at a variable rate determined by said first compression signal to form a first encoded video signal;
- a second video encoder for encoding said second video signal at a variable rate determined by said second compression signal to form a second encoded video signal; and
- a video generator for permanently recording said first and second encoded video signals so that said first and second encoded video signals can be repeatedly broadcast from said video generator,
- wherein said first video signal has a complexity which varies over time, wherein said second video signal has a complexity which varies over time, and wherein said video analyzer comprises:
  - means for determining a weighting factor based upon said complexity of said first video signal and said complexity of said second video signal; and
  - means for generating said first compression signal based upon said weighting factor and said complexity of said first video signal.

5. An apparatus for recording a plurality of video signals, said apparatus comprising:
- a video analyzer for analyzing a first video signal and a second video signal and generating a first compression signal and a second compression signal;
- a first video encoder for encoding said first video signal at a variable rate determined by said first compression signal to form a first encoded video signal;
- a second video encoder for encoding said second video signal at a variable rate determined by said second compression signal to form a second encoded video signal; and
- a video generator for permanently recording said first and second encoded video signals so that said first and second encoded video signals can be repeatedly broadcast from said video generator,
- wherein said first video signal has a complexity which varies over time and is segmented into a plurality of video frames each having a type, wherein said second video signal has a complexity which varies over time and is segmented into a plurality of video frames each having a type, and wherein said video analyzer comprises:
  - means for determining a weighting factor based upon said complexity of said first video signal, said complexity of said second video signal, and said type of one of said video frames of each of said first and second video signals; and means for generating said first compression signal based upon said weighting factor and said complexity of said first video signal.

6. An apparatus for recording a plurality of video signals, said apparatus comprising:

a video analyzer for analyzing a first video signal and a second video signal and generating a first compression signal and a second compression signal;

a first video encoder for encoding said first video signal at a variable rate determined by said first compression signal to form a first encoded video signal;

a second video encoder for encoding said second video signal at a variable rate determined by said second compression signal to form a second encoded video signal; and a video generator for permanently recording said first and second encoded video signals so that said first and second encoded video signals can be repeatedly broadcast from said video generator, wherein said first video signal has a complexity which varies over time, wherein said second video signal has a complexity which varies over time, and wherein said video analyzer comprises means for generating said compression signals based upon said complexity of said first video signal and said complexity of said second video signal.

7. An apparatus as defined in claim 6 wherein each of said first and second encoded video signals corresponds to a movie and wherein said video generator comprises means for broadcasting said first and second encoded video signals a plurality of times in a day at predetermined times.

8. An apparatus as defined in claim 6 wherein each of said first and second encoded video signals corresponds to a movie and wherein said video generator comprises means for broadcasting said first and second encoded video signals a plurality of times in a month at predetermined times.

9. An apparatus as defined in claim 6 additionally comprising a multiplexer connected to receive said first and second encoded video signals from said first and second video encoders and to transmit said first and second encoded video signals to said video generator.

10. An apparatus for recording a plurality of video signals, said apparatus comprising:

a video analyzer for analyzing a first video signal and a second video signal and generating a first compression signal and a second compression signal;

a first video encoder for encoding said first video signal at a variable rate determined by said first compression signal to form a first encoded video signal;

a second video encoder for encoding said second video signal at a variable rate determined by said second compression signal to form a second encoded video signal; and a video generator for permanently recording said first and second encoded video signals so that said first and second encoded video signals can be repeatedly broadcast from said video generator, wherein said first video signal has a complexity which varies over time and is segmented into a plurality of video frames each having a type, wherein said second video signal has a complexity which varies over time and is segmented into a plurality of video frames each having a type, and wherein said video analyzer comprises means for generating said compression signals based upon said complexity of said first video signal, said complexity of said second video signal, and said type of one of said video frames of each of said first and second video signals.

11. An apparatus for recording a plurality of video signals, said apparatus comprising:

a video analyzer for analyzing a first video signal corresponding to a movie and a second video signal corresponding to a movie and generating a first compression signal and a second compression signal;

a first video encoder for encoding said first video signal at a variable rate determined by said first compression signal to form a first encoded video signal;

a second video encoder for encoding said second video signal at a variable rate determined by said second compression signal to form a second encoded video signal; and means for permanently recording said first and second encoded video signals and broadcasting said first and second encoded video signals a plurality of times in a month at predetermined times, wherein said first video signal has a complexity which varies over time and is segmented into a plurality of video frames each having a type, wherein said second video signal has a complexity which varies over time and is segmented into a plurality of video frames each having a type, and wherein said video analyzer comprises means for generating said compression signals based upon said complexity of said first video signal, said complexity of said second video signal, and said type of one of said video frames of each of said first and second video signals, and wherein each of said first and second encoded video signals corresponds to a movie and wherein said broadcasting means comprises means for broadcasting said first and second encoded video signals a plurality of times in a day at predetermined times.

12. An apparatus for recording a plurality of video signals, said apparatus comprising:

a video analyzer for analyzing a first video signal corresponding to a movie and a second video signal corresponding to a movie and generating a first compression signal and a second compression signal;

a first video encoder for encoding said first video signal at a variable rate determined by said first compression signal to form a first encoded video signal;

a second video encoder for encoding said second video signal at a variable rate determined by said second compression signal to form a second encoded video signal; and means for permanently recording said first and second encoded video signals and broadcasting said first and second encoded video signals a plurality of times in a month at predetermined times, wherein said first video signal has a complexity which varies over time, wherein said second video signal has a complexity which varies over time, and wherein said video analyzer comprises means for generating said compression signals based upon said complexity of said first video signal and said complexity of said second video signal.

13. An apparatus for recording a plurality of video signals, said apparatus comprising:

a video analyzer for analyzing a first video signal corresponding to a movie and a second video signal corresponding to a movie and generating a first compression signal and a second compression signal;

a first video encoder for encoding said first video signal at a variable rate determined by said first compression signal to form a first encoded video signal;

a second video encoder for encoding said second video signal at a variable rate determined by said second compression signal to form a second encoded video signal; and means for permanently recording said first and second encoded video signals and broadcasting said first and second encoded video signals a plurality of times in a month at predetermined times, wherein said first video signal has a complexity which varies over time and is segmented into a plurality of video frames each having a type, wherein said second video signal has a complexity which varies over time and is segmented into a plurality of video frames each having a type, and wherein said video analyzer comprises means for generating said compression signals based upon said complexity of said first video signal, said complexity of said second video signal, and said type of one of said video frames of each of said first and second video signals.

14. A method of recording a plurality of video signals, said method comprising the steps of:

(a) analyzing a first video signal and a second video signal and generating a first compression signal and a second compression signal;
   (b) encoding said first video signal at a variable rate determined by said first compression signal to form a first encoded video signal;
   (c) encoding said second video signal at a variable rate determined by said second compression signal to form a second encoded video signal;
   (d) permanently recording said first and second encoded video signals on a video generator; and
   (e) broadcasting said first and second encoded video signals repeatedly from said video generator after said first and second encoded video signals are recorded, wherein said step (e) comprises the step of broadcasting said first and second encoded video signals a plurality of times in a month at predetermined times, wherein said first video signal has a complexity which varies over time and is segmented into a plurality of video frames each having a type, wherein said second video signal has a complexity which varies over time and is segmented into a plurality of video frames each having a type, and wherein said step (a) comprises the steps of:

(a1) generating a first complexity signal representative of said complexity of said first video signal;
   (a2) generating a second complexity signal representative of said complexity of said second video signal; and
   (a3) generating a first frame signal representing said type of one of said video frames of said first video signal;
   (a4) generating a second frame signal representing said type of one of said video frames of said second video signal; and
   (a5) generating said first and second compression signals based on said first and second complexity signals and said first and second frame signals.

15. A method as defined in claim 14 wherein said step (e) comprises the step of broadcasting said first and second encoded video signals a plurality of times in a month at predetermined times.

16. A method as defined in claim 14 wherein said step (e) comprises the step of broadcasting said first and second encoded video signals a plurality of times in a day at predetermined times.

17. A method of recording a plurality of video signals, said method comprising the steps of:

(a) analyzing a first video signal and a second video signal and generating a first compression signal and a second compression signal;
   (b) encoding said first video signal at a variable rate determined by said first compression signal to form a first encoded video signal;
   (c) encoding said second video signal at a variable rate determined by said second compression signal to form a second encoded video signal;
   (d) permanently recording said first and second encoded video signals on a video generator; and
   (e) broadcasting said first and second encoded video signals repeatedly from said video generator after said first and second encoded video signals are recorded, wherein said first video signal has a complexity which varies over time, wherein said second video signal has a complexity which varies over time, and wherein said step (a) comprises the steps of:

(a1) generating a first complexity signal representative of said complexity of said first video signal;
   (a2) generating a second complexity signal representative of said complexity of said second video signal; and
   (a3) generating said first and second compression signals based on said first and second complexity signals.

18. A method of recording a plurality of video signals, said method comprising the steps of:

(a) analyzing a first video signal and a second video signal and generating a first compression signal and a second compression signal;
   (b) encoding said first video signal at a variable rate determined by said first compression signal to form a first encoded video signal;
   (c) encoding said second video signal at a variable rate determined by said second compression signal to form a second encoded video signal;
   (d) permanently recording said first and second encoded video signals on a video generator; and
   (e) broadcasting said first and second encoded video signals repeatedly from said video generator after said first and second encoded video signals are recorded, wherein said first video signal has a complexity which varies over time and is segmented into a plurality of video frames each having a type, wherein said second video signal has a complexity which varies over time and is segmented into a plurality of video frames each having a type, and wherein said step (a) comprises the steps of:

(a1) generating a first complexity signal representative of said complexity of said first video signal;
   (a2) generating a second complexity signal representative of said complexity of said second video signal; and
   (a3) generating a first frame signal representing said type of one of said video frames of said first video signal;
   (a4) generating a second frame signal representing said type of one of said video frames of said second video signal; and
   (a5) generating said first and second compression signals based on said first and second complexity signals and said first and second frame signals.

* * * * *